Feb. 16, 1965 W. C. OAKS 3,169,318
DENTAL HANDPIECE AND APPARATUS FOR SUPPLYING
HEATED FLUID THERETO
Filed June 20, 1960
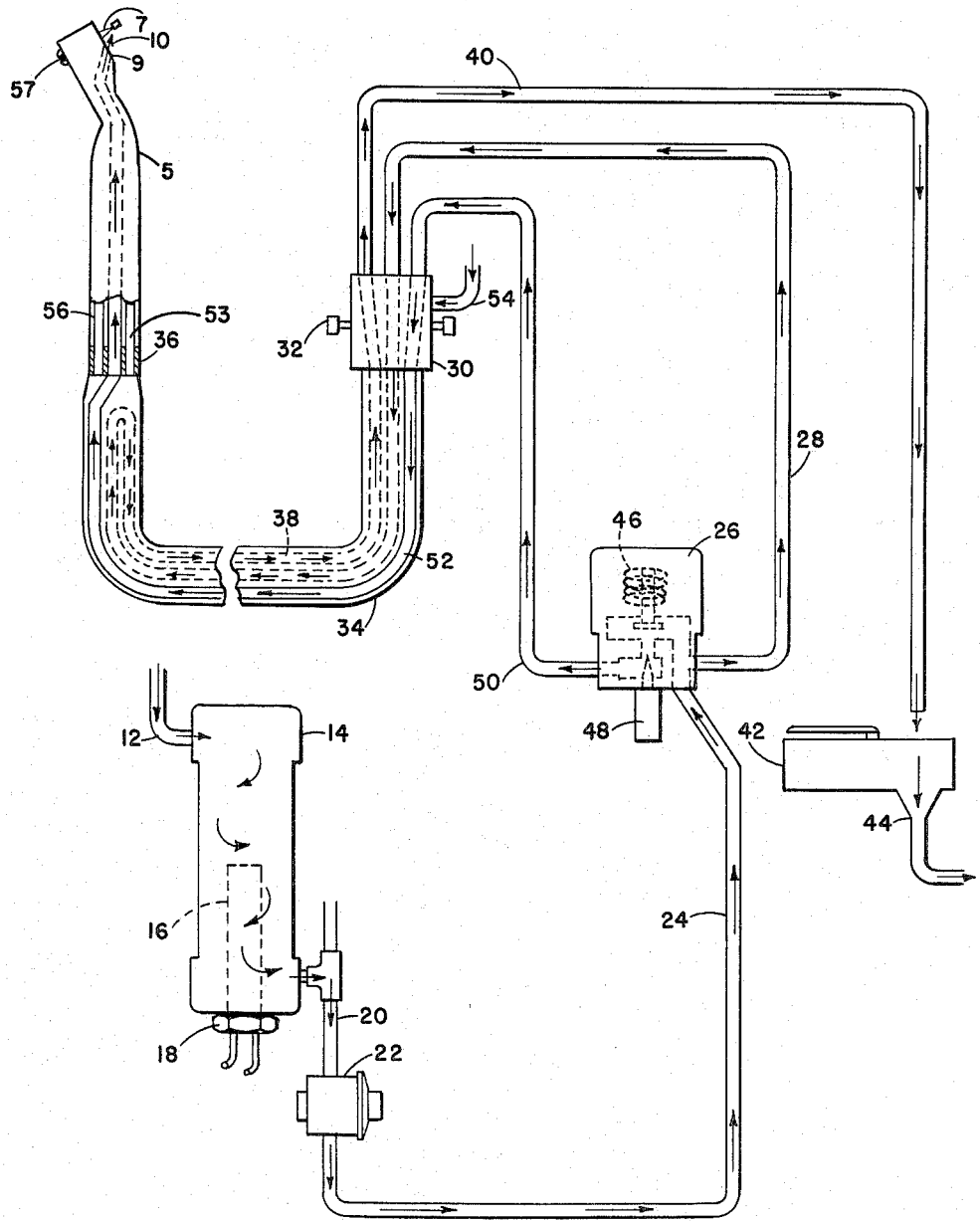
INVENTOR.
WILLIS C. OAKS
BY
ATTORNEYS

United States Patent Office 3,169,318
Patented Feb. 16, 1965

3,169,318
DENTAL HANDPIECE AND APPARATUS FOR
SUPPLYING HEATED FLUID THERETO
Willis C. Oaks, Scotia, N.Y., assignor to Ritter Company,
Inc., Rochester, N.Y., a corporation of Delaware
Filed June 20, 1960, Ser. No. 37,262
7 Claims. (Cl. 32—28)

My invention relates to dental apparatus and more particularly to apparatus for separately supplying air and heated water to a dental handpiece and maintaining the heated water at substantially the same temperature during inoperative as well as operative periods of the handpiece.

This apparatus is preferably adapted for use with a dental handpiece in which is mounted a turbine driven high-speed dental drill operatively controlled by fluid pressure on the turbine. The apparatus for maintaining of the water at substantially the same temperature during operative and inoperative periods is adaptable to dental warm water syringes.

With the evolution of the high-speed dental drill, designed to attain speeds in excess of 250,000 r.p.m., a number of auxiliary problems have developed for suppliers of dental equipment to overcome. One of the auxiliary problems encountered in attaining these higher cutting speeds has been the heat generated during the drilling which has given rise to the development of various systems of readily dissipating this heat. Although not a new problem, this type of drill has certainly not lessened the problem of removing the debris cut away by the dental bur or drill. Therefore, the most common method of cooling the dental bur and tooth has been to spray water severally or a combination with air under pressure onto the dental bur and operative area to thereby accomplish the desired effect and float dental debris out of the operative area.

Most of these cooling systems provide apparatus for heating the liquid coolant to prevent chilling of the patient and particularly of the sensitive nerve in the operative area. Preferably, the temperature of the coolant is maintained at body temperature to give the greatest amount of comfort to the patient. Heretofore, it has been a problem to maintain the water initially discharged at a constant body temperature during periods of non-use of the handpiece.

Heretofore, in order to avoid the undesirable chilling effects on patients, dentists had to turn on the dental unit in which a heater is mounted for a sufficient period of time to warm the water to body temperature. Thereafter, he had to initially discharge sufficient water to conduct heated water from the source at which the water is heated, just as a person must do when he wants hot water from a household faucet.

After each inoperative period of the handpiece throughout the day, this same procedure was necessary to avoid chilling the patient.

This inability to initially secure water at body temperature has been common to all types of dental syringes as well as dental drills of the high-speed variety. This problem with syringes antedates the high-speed drills and has continued to harass and vex all dentists. This problem has meant considerable loss of time and money to the dentists, and yet, has been an unavoidable necessity in order to perform his work with the greatest of comfort to his patients.

Therefore, it is an object of my invention to provide apparatus for heating that quantity of water extending from substantially the ordinary source of heated water to the point of discharge in the dental handpiece.

My invention contemplates the provision of a heat exchanger apparatus for maintaining the water being discharged from a dental handpiece including a dental bur or syringe at substantially body temperature including that water extending from the source of heated water to the dental handpiece during normal periods of inoperative use.

It is a further object of my invention to eliminate the necessity for a dentist to discharge a quantity of water from the dental handpiece or warm water syringe prior to using the dental handpiece in order to prevent discomfort of his patient.

Another object of my invention is the provision of a fluid heating system which will initially discharge preheated water at a point removed from the source of heated water.

A further object of my invention is the provision of a simple and inexpensively manufactured heat exchanger apparatus to accomplish all of the above set forth objects.

Other objects and advantages of my invention will be particularly set forth in the claims and will be apparent from the following description of one embodiment of my invention when taken in connection with the accompanying drawing, which is a diagrammatic view of one embodiment of my invention.

With reference to the drawing, the embodiment of my invention to be described is shown attached to a dental turbine handpiece 5 equipped with a fluid driven turbine (not shown) mounted inside of the extreme top portion of the handpiece 5, as viewed in the drawing. The handpiece is effective to operate a dental bur 7 onto which is sprayed water or other coolant from an orifice 9 directed toward the bur 7 as indicated by the arrow 10. My invention contemplates use with any of the fluid type turbine-driven high-speed dental drills such as those driven by air under pressure, which type is illustrated in the described embodiment of my invention. However, it will be understood that my invention also contemplates use with a turbine handpiece in which water is utilized to drive the high-speed turbine. My invention is further effective with the recently developed vacuum dental drill, utilizing reduced air pressure to drive the turbine mounted in the handpiece.

In the illustrated embodiment of my invention, water to be supplied to the dental handpiece 5 flows through an inlet pipe 12 connected to a warm water tank 14 equipped with a thermostatically controlled heating element 16, preferably regulated to heat the water to a temperature calculated to be discharged at the orifice 9 at normal body temperature. The type of heating element being a matter of choice and not a part of my invention. I have merely illustrated a heating element secured at the bottom of the tank 14 by a nut 18.

The heated water passes out of the tank 14 into an outlet tube or pipe 20 conducting it to a water pressure regulator 22 being effective to control the pressure of the heated water. The pressure controlled heated water is thereafter conducted through a tube or pipe 24 to a combination solenoid and needle valve 26. As used in the claims, it will be understood that the phrase "source of fluid supply" includes whatever structure is necessary to supply the fluid to the combination valve 26. A tube or pipe 28 is provided from the solenoid-needle valve combination to continuously conduct the pressure regulated heated water through a fitting 30. The fitting 30 is pivotally mounted, as at 32, to the interior portion of a dental unit (not shown). This pivotal mounting, as indicated at 32, provides a preferential arrangement for use inside a dental unit in which the turbine handpiece 5 is retractable by a biased retriever pulley (not shown) on which a fluid connection tube 34 travels. The tube 34 extends from the fitting 30 to which it is connected at one end to the dental handpiece 5 to which it is connected at the other end at 36. However, it will be understood that depending upon the chosen manner of mounting the tube 34 for operative and inoperative use, the fitting 30 may be mounted in any selected manner having no bearing whatsoever on my invention as described here.

For purposes of clarity, it should be pointed out here that the diagrammatic illustrated tube 34 (and portions enclosed thereby) is shown disproportionately large in diameter and short in length as compared to all other illustrated parts. It will be understood from the nature of my invention that preferably the distance between the warm water tank 14 and the fitting 30 will be minimal to prevent heat loss of the water between the tank 14 and the fitting 30.

At the fitting 30, the pressure regulated heated water flowing through the pipe 28 enters a heater member or heat exchanger 38, shown in broken lines for purposes of illustration. The heated water passing through the heat exchanger 38 is discharged through the fitting into a discharge tube or outlet pipe 40 into a cup filler 42 mounted on the dental unit (not shown) and equipped with a drain 44.

The combination valve 26 is provided with an electrically controlled solenoid valve 46 having a normally closed position. The valve is illustrated in its open position. The combination valve also includes a manually controlled needle valve 48. This provides a compact arrangement for both metering and stopping the flow of heated water flowing under pressure through the combination valve 26 into a tube or pipe 50. Thus, an operator can manually adjust the needle valve 48 to govern the rate of flow through the pipe 50 and by electrical means (not shown) move the solenoid valve 46 to its normally closed position and stop the flow of water to the pipe 50. The operation of the solenoid valve 46 is preferably controlled by a foot operated controller (not shown) not constituting a part of this invention, which preferably is effective to initiate operation of the dental bur 7. Although not shown, it is desirable to provide a manual switch for controlling the solenoid valve 46 whereby the flow of water can be turned off if selected during the operative period of the dental bur 7. The pressure regulated metered warm water flowing through the pipe 50 passes through the fitting 30 as indicated in broken lines and enters a conduit 52 conducting fluids to the handpiece 5. The conduit 52 is connected at one end to the fitting 30 and at the other end to a tube or pipe 53 which extends from the lower end of the handpiece 36 through handpiece 5 to the orifice 9.

Air under pressure is introduced into the fitting 30 through a pipe or tube 54 by which it is conducted into that interior portion of the fluid connections tube 34 not occupied by the heat exchanger 38 and conduit 52. The air under pressure is conducted from the tube 34 through an annular passage 56 formed concentrically between the handpiece 5 and the tube 53. Hence, the air and water flow concentrically through handpiece 5, and in the upper portion thereof their flow paths diverge by means of apparatus not constituting a part of this invention. After diverging, the water is discharged through the orifice 9; the air flows into and drives the turbine (not shown) from where it is discharged through an opening 57 provided in the handpiece or at any other selected position on the handpiece.

In operation a dentist or his dental assistant will turn on the electric controls for his dental unit which will render the heating element 16 effective to warm the water in tank 14, and water will commence flowing through the pipe 12, tank 14, pipe 20, pressure regulator 22, pipe 24 and pipe 28 to the heat exchanger 38. The dynamic quantity of heated water flowing through the heat exchanger 38 transfers heat to the static cold water in the conduit 52. After the initial warming-up period, the temperatures of the static water in the conduit 52 and the dynamic water flowing through the heat exchanger 38 will be substantially equalized to the normal body temperature of a patient. The continuous flow of dynamic heated water through the heat exchanger 38 will maintain the static water in the conduit 52 at body temperature.

It will be understood that the conduit 50 is of minimal length due to the fact that the head of water in conduit 50 is static when the water in conduit 52 is static.

Thus, I have provided apparatus whereby once the heat exchanger 38 has effectively raised the temperature of the static quantity of water in the conduit 52 to substantially the normal body temperature. Substantially all water being discharged at orifice 9 during operative periods of handpiece 5 will be of normal body temperature.

When the dentist is ready to use the turbine handpiece 5 and dental bur 7 mounted therein, he merely withdraws the handpiece 5 and accompanying fluid connections tube 34 and actuates a foot controller (not shown) or other comparable device effective to open a solenoid or other valve (not shown) controlling the flow of air under pressure through the pipe 54 and the solenoid valve 46 permitting a portion of the water flowing through the pipe 24 to be diverted into pipe 50, through conduit 52, through pipe 53 and in turn discharged at the orifice 9 of the handpiece 5. Thus, I have provided apparatus for instantaneously supplying water at normal body temperature to the operative area and for eliminating the long established practice of initially operating the turbine handpiece 5 or a dental syringe (not shown) for a period sufficient to permit the discharge of the static quantity of cold water in the conduit 52 and pipe 50.

I have advanced the art of dental apparatus by providing a convenient means for the dentist to commence operation with a turbine handpiece or other dental tool utilizing warm water without the harassing inconvenience of stopping to discharge the quantity of static cold water which in the past was a matter of routine with dentists, not only at the outset of the day but after any extended periods of inoperative use.

While I have shown and described the preferred form of mechanism of my invention it will be apparent that various modifications and changes may be made therein, particularly in the form and relation of parts, without departing from the spirit of my invention as set forth in the appended claims.

I claim:

1. In combination with a dental handpiece, apparatus for supplying fluid of a selected temperature to a discharge point on said dental handpiece comprising: a first fluid conduit extending from a source of fluid supply of a selected temperature to said discharge point; a second fluid conduit means in heat exchange relationship with at least a portion of said first conduit being in close proximity to said discharge point; a first end of said second conduit means being connected to a source of fluid supply of a selected temperature and a second end of said second conduit terminating at a discharge point away from said handpiece; and means for selectively conducting fluid through said first conduit and for continuously conducting fluid through said second conduit.

2. Apparatus in accordance with claim 1 in which said selective means comprises a valve between said first and second conduits permitting selective fluid supply to said first conduit while fluid is being continuously supplied to said second conduit.

3. In combination with a dental handpiece, apparatus for supplying water of a selected temperature to a discharge point on said dental handpiece comprising: a fluid connections hose attached at one end to said dental handpiece; a first water conduit extending from a source of heated water supply of a selected temperature through said hose and handpiece to said discharge point; a second water conduit means extending through and back out of said hose in heat exchange relationship with at least a portion of said first conduit being adjacent said dental handpiece and in close proximity to said discharge point, a first end of said second conduit means being connected to a source of heated water supply of a selected temperature and a second end of said second conduit terminating at a discharge point away from said handpiece; and means for selectively conducting water through said first conduit and for continuously conducting water through said second conduit.

4. Apparatus in accordance with claim 3 in which said selective means comprises a valve between said first and second conduits, said valve having a normally closed position permitting heated fluid to flow through only said second conduit and an open position permitting heated fluid to flow to both of said conduits, thereby continuously supplying fluid of substantially the same temperature at said dental handpiece discharge point from initial operative use of said dental handpiece.

5. Apparatus in accordance with claim 4 including adjustable means for metering the flow of water through said first conduit.

6. In combination with a dental handpiece having an air driven turbine therein, apparatus for supplying water of a selected temperature to a discharge point on said dental handpiece and suppling air to said turbine comprising. a fluid connections hose attached at one end to said dental handpiece and communicating with said turbine for delivering air to the turbine, said hose being connected at the other end to a source of air; a first water conduit extending from a source of heated water supply of a selected temperature through said hose and handpiece to said discharge point; a second water conduit means extending through and back out of said hose in heat exchange relationship with at least a portion of said first conduit being adjacent said dental handpiece and in close proximity to said discharge point; a first end of said second conduit means being connected to a source of heated water supply of a selected temperature and a second end of said second conduit terminating at a discharge point away from said handpiece; and means for selectively conducting water through said first conduit and for continuously conducting water through said second conduit.

7. Apparatus in accordance with claim 6 wherein said selective means comprises a double valve having a valve stopping the flow of the water and a valve for metering the flow of water.

References Cited in the file of this patent
UNITED STATES PATENTS

| | | |
|---|---|---|
| 2,245,036 | Henschel | June 10, 1941 |
| 2,420,338 | Page | May 13, 1947 |